W. M. SAUNDERS.
Horse Hay-Rake.
No. 207,986. Patented Sept. 10, 1878.
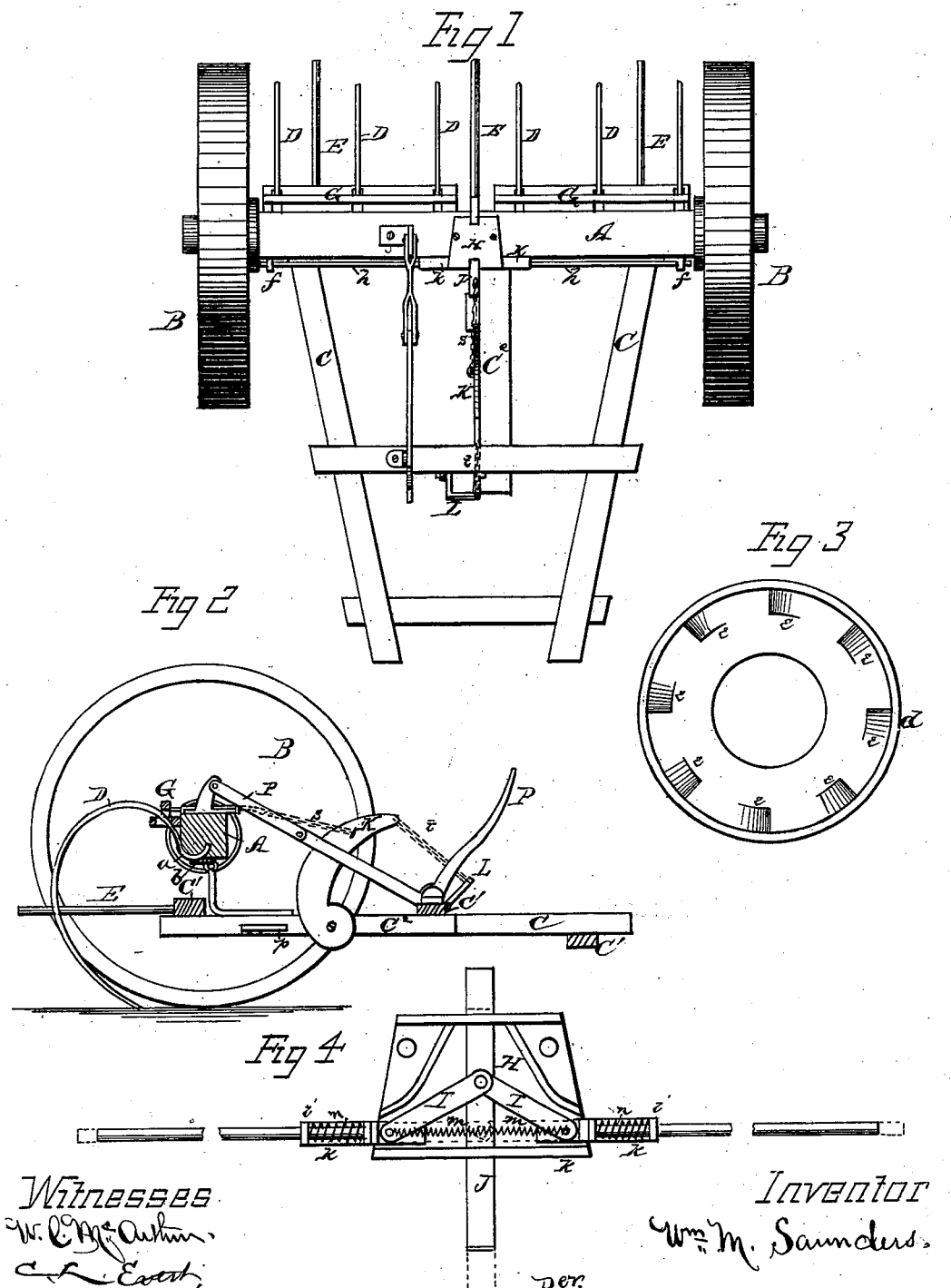

UNITED STATES PATENT OFFICE.

WILLIAM M. SAUNDERS, OF ALFRED CENTRE, NEW YORK.

IMPROVEMENT IN HORSE HAY-RAKES.

Specification forming part of Letters Patent No. 207,986, dated September 10, 1878; application filed March 19, 1877.

*To all whom it may concern:*

Be it known that I, WILLIAM M. SAUNDERS, of Alfred Centre, in the county of Allegany and State of New York, have invented certain new and useful Improvements in Horse Hay-Rakes; and I do hereby declare that the following is a full, clear, and exact description thereof, reference being had to the accompanying drawings, and to the letters of reference marked thereon, which form part of this specification.

The nature of my invention consists in the construction and arrangement of a self-dumping hay-rake, as will be hereinafter more fully set forth.

In order to enable others skilled in the art to which my invention appertains to make and use the same, I will now proceed to describe its construction and operation, referring to the annexed drawings, in which—

Figure 1 is a plan view of my rake. Fig. 2 is a central cross-section, and Figs. 3 and 4 are details of my invention.

A represents the rake-head, provided with a spindle at each end, upon which the wheels B B are placed. To the under side of the rake-head A are hinged the shafts C C, connected by suitable cross-bars $C^1 C^1$, and having a longitudinal bar, $C^2$, secured to said cross-bars in the center between the shafts. From the rear cross-bar, $C^1$, project the straight clearing-teeth E E.

D D represent the rake-teeth, which are attached to the rake-head by grooving the back corner of the head at $a\ a$ for each tooth, and then fastening strips $b\ b$ on the under side of the head for holding the teeth in place. On the back side of the head are fastened guides G G, in the form of an inverted T, with central slots for the passage of the teeth D, each tooth being guided separately and movable independent of the others.

On the inner end of the hub of each wheel B is a series of projecting lugs, $e\ e$, arranged in a circle concentric with the wheel; and these lugs are surrounded by a rim or flange, $d$, which protects the same against the hay that would otherwise wind upon them and clog.

$h\ h$ represent two rods arranged along the upper front corner of the rake-head, to be moved outward for engaging with the lugs $e$ on the driving-wheels and dump the rake. The outer end of each rod $h$ is held in a stationary guide, $f$, while the inner end passes through two ears, $i\ i$, projecting from the under side of a bar, $k$, placed in a box or frame, H, secured on top of the rake-head.

The inner ends of the two bars $k\ k$ are, by means of two pivoted arms, I I, connected with a slide, J, arranged at right angles with the rake-head, as shown. The inner ends of the two bars $k\ k$ are connected together by a spiral spring, $m$, which draws the rods $h\ h$ inward, and around each rod $h$, between the ears $i\ i$, is a spiral spring, $n$, arranged to hold the rod in certain position.

By moving the slide J forward the toggle-arms I I are straightened, forcing the bars $k$ and rods $h$ outward until the outer ends of said rods are caught by the lugs $e$ on the wheels B, and thus lock the rake-head to the wheels, so that as the rake advances the rake will be dumped by the head turning on its hinges. When the rake-head has turned sufficiently forward, the front end of the slide J strikes a stop, $p$, on the bar $C^2$, which forces the slide backward, breaking or releasing the lock of the toggle-arms, so that the spring $m$ will at once draw the rods $h$ inward away from the wheels. The independent springs $n$ on the rods $h$ allow of the rake turning, or, in other words, one wheel turning backward while dumping.

The slide J is, by a chain, $s$, connected with a pivoted curved hand-lever, K, and the upper end of this lever, by another chain, $t$, connected with a foot-lever, L, so that the driver can work the slide either by hand or foot for automatically dumping the rake.

P P represent a suitable hand-lever, arranged to dump the rake by hand when desired.

Having thus fully described my invention, what I claim as new, and desire to secure by Letters Patent, is—

1. The combination of the rake-head A, having grooves $a\ a$, as described, the rake-teeth D D, strips $b$, and centrally-slotted T-shaped guides G, substantially as and for the purposes herein set forth.

2. The combination, in a horse hay-rake, of the locking-rods h h, the springs n n, for giving the same a yielding pressure outward, the bars k k, with ears i i, the connecting-spring m, the toggle-arms I I, connecting the bars k k with the slide J, the levers K L, and stop p, all constructed and arranged to operate substantially as and for the purposes herein set forth.

In testimony that I claim the foregoing as my own I affix my signature in presence of two witnesses.

WILLIAM M. SAUNDERS.

Witnesses:
A. W. COON,
JAMES R. CRANDALL.